Dec. 11, 1945.　　A. L. HIGHBERG　　2,390,881
SPARK CONTROL
Filed Dec. 23, 1942

INVENTOR
Axel L. Highberg
BY
Charles L. Shelton
Attorney

Patented Dec. 11, 1945

2,390,881

UNITED STATES PATENT OFFICE 2,390,881

SPARK CONTROL

Axel L. Highberg, West Hartford, Conn., assignor to United Aircraft Corporation, East Hartford, Conn., a corporation of Delaware Application December 23, 1942, Serial No. 469,929

6 Claims. (Cl. 123—149)

This invention pertains to the control of spark timing on internal combustion engines.

This invention may be used on a wide variety of engine types, but is particularly adapted for radial engines.

An object of the invention is to provide means while the engine is in operation, for simultaneously and similarly adjusting the spark timing of all the magnetos on an engine by hydraulic mechanism.

More specifically, an object is to provide a train of gears for driving a number of magnetos from the crankshaft of a radial engine, together with, a mechanism including a pair of hydraulic cylinders for simultaneously changing the angular positions of all the magneto drive gears with reference to the engine crankshaft.

Other objects and advantages will be apparent from the specification and claims, which describe what is now considered to be a preferred embodiment of the invention.

Figure 1:
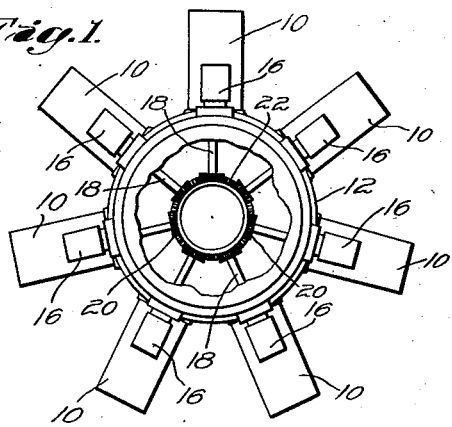
Fig. 1 is a schematic front view of a seven cylinder radial engine with seven magnetos, the nose of the engine crankcase being broken away to show the magneto drive gearing.
Figure 2:
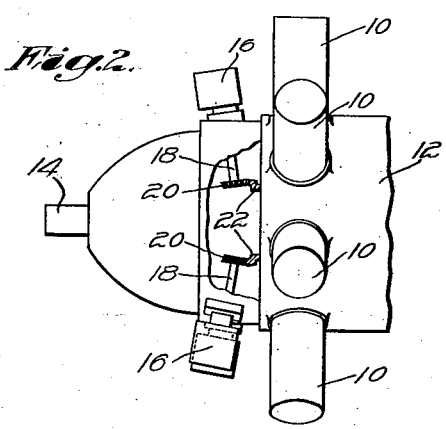
Fig. 2 is a side view of Fig. 1 with the crankcase broken away to show another view of the magneto drive gearing.
Figure 3:
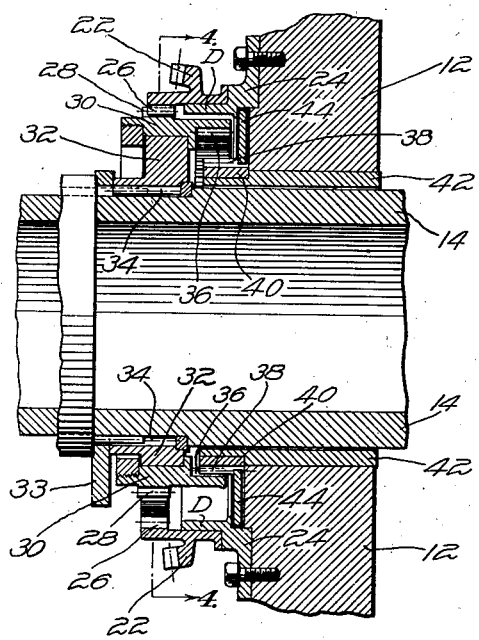
Fig. 3 is an enlarged sectional side view showing the magneto drive gearing in detail.
Figure 4:
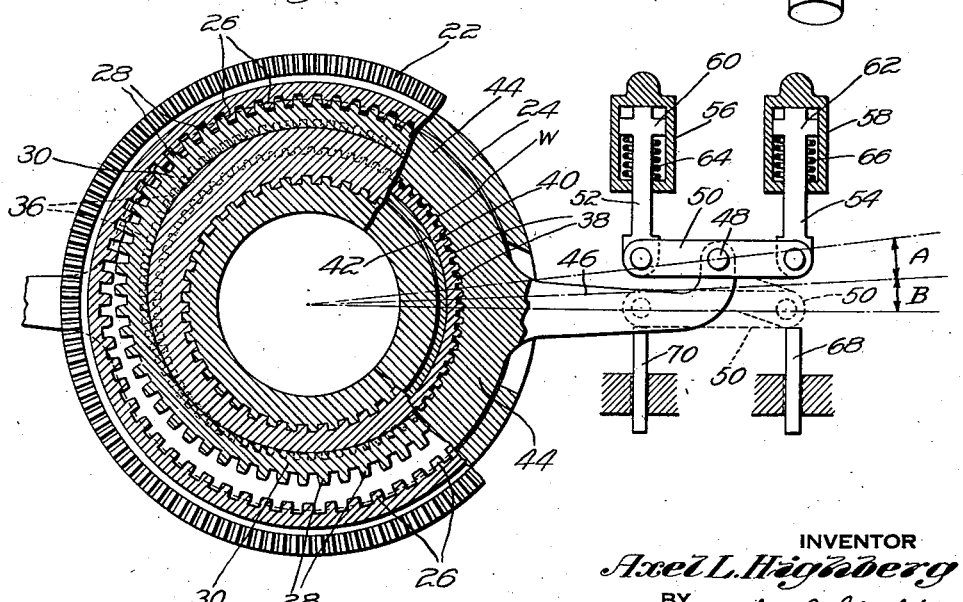
Fig. 4 is a view on the line 4—4 of Fig. 3 with the addition of a pair of hydraulic control cylinders and an arm connecting those cylinders to the gearing.

The engine has seven cylinders 10 radially mounted on crankcase 12 and driving a crankshaft 14. There are seven magnetos 16 also radially mounted on crankcase 12 and each having a shaft 18 rotated by a bevel gear 22 which rotates on a supporting ring 24 attached to the crankcase.

Gear 22 is provided with internal gear teeth 26 engaging some of the gear teeth 28 on a ring gear 30 which is of less diameter than gear 22 and supported for rotation on an eccentric 32 splined to shaft 14 at 34. Eccentric 32 is counterbalanced by a weight 33, also splined to the shaft.

Ring 30, in turn, has internal gear teeth 36 engaging some of the teeth 38 on gear ring 40 which is co-axial with shaft 14, of less diameter than ring 30, and supported for rotation on a bearing ring 42. Closely surrounding gear 40 is a ring 44 having internal teeth engaging the teeth of gear 40 and preventing rotation of gear 40 except within certain limits. Rotation within these limits is effected by adjustment of ring 44. Ring 44 is provided with radially projecting arms, one of which is shown at 46.

Due to the spline 34, eccentric 32 is rotated by shaft 14. Rotation of eccentric 32 causes teeth 28 on ring gear 30 to mesh successively with internal gear teeth 26 on gear 22. Also, internal gear teeth 36 on ring gear 30 will be caused to mesh successively with teeth 38 on gear 40. Due to the fact that teeth 26 and 28 are unequal in number and teeth 36 and 38 are unequal in number, gear 22 will be rotated.

The above described combination is disclosed in the application of Alexander H. King, Serial No. 534,896, filed May 10, 1944, and assigned to applicant's assignee, which follows, to a certain extent, in some details, the teachings of Regan Patent No. 546,249, and provides the background for the improvements about to be described, by which the timing of the magnetos may be adjusted.

The outer end of the arm 46 is connected as at 48 to a floating link 50, the ends of the link being connected to piston rods 52 and 54 of pistons 60 and 62 in hydraulic cylinders 56 and 58. The pistons are normally held at the upper limits of their strokes by springs 64 and 66.

Either piston may be moved against its spring by admitting fluid above the piston, and each new piston position means a different timing of the magneto with reference to the engine crankshaft, because rotation of gear 40 results in a change in the angular relationship between gear 22 and shaft 14. For instance, as illustrated, with both pistons in their upper positions and link 50 in its full-line position, the magnetos may give retarded sparks. If piston 62 is moved to a low position as limited by stop 68, link 50 will be in its inclined dotted-line position, ring 44 will be rotated through angle A, and the timing will be advanced accordingly.

If piston 60 be also moved to its low position as limited by stop 70, link 50 will be in its dotted-line horizontal position and the timing of the magnetos will be advanced through the additional angle B. Stops 68 and 70 may be adjustable if desired. Release of fluid pressure in the cylinders will permit the springs to move ring 44 back to magneto retarded position.

It is to be understood that the invention is not limited to the specific embodiment herein illustrated and described but may be used in other ways without departure from its spirit as defined by the following claims.

I claim:

1. Apparatus for controlling the spark timing on an aircraft engine having a crankshaft, a magneto and a train of gears driving said magneto, one of said gears being normally non-rotatable, in combination with means adjustable while the engine is in operation for slightly rotating said normally non-rotatable gear, said rotating means including a hydraulic cylinder operatively connected to said adjustable gear.

2. Apparatus for controlling the spark timing on an aircraft engine having a crankshaft, a magneto and a train of gears driving said magneto, one of said gears being normally non-rotatable, in combination with means adjustable while the engine is in operation for slightly rotating said normally non-rotatable gear, said rotating means including an arm projecting radially from said adjustable gear, and a hydraulic cylinder for moving said arm.

3. Apparatus for controlling the spark timing on an aircraft engine having a crankshaft, a magneto and a train of gears driving said magneto, one of said gears being normally non-rotatable, in combination with means adjustable while the engine is in operation for slightly rotating said normally non-rotatable gear, said means including a pair of hydraulic cylinders connected to said adjustable gear and operable singly or jointly, substantially as described.

4. Apparatus for controlling the spark timing on an aircraft engine having a crankshaft, a magneto and a train of gears driving said magneto, one of said gears being normally non-rotatable, in combination with means adjustable while the engine is in operation for slightly rotating said normally non-rotatable gear, said means including a pair of hydraulic cylinders connected to opposite ends of a floating link which is operably connected to said adjustable gear.

5. Apparatus for controlling the spark timing on an aircraft engine having a crankshaft, a magneto and a train of gears driving said magneto, one of said gears being normally non-rotatable, in combination with means adjustable while the engine is in operation for slightly rotating said normally non-rotatable gear, said means including a pair of hydraulic cylinders connected to opposite ends of a floating link which is operably connected to said adjustable gear, said link having a normal position and two adjusted positions, the first of said adjusted positions being attained when one of said cylinders is energized and the second of said positions being obtained when both said cylinders are energized.

6. In combination with three or more fixed magnetos arranged in a circumferential row around an engine crankshaft, a magneto drive shaft extending radially inward from each said magneto toward the crankshaft axis, a gear train drivingly connecting each of said magneto drive shafts with said crankshaft for simultaneously and positively driving all said magneto shafts at a predetermined speed relative to the speed of said crankshaft, and means for simultaneously and similarly changing the angular position of each of said magneto shafts with respect to said crankshaft comprising a pair of hydraulic cylinders connected to opposite ends of a floating link which is operably connected to one of the gears in said gear train, said link having a normal position and two adjusted positions, the first of said adjusted positions being attained when one of said cylinders is energized and the second of said positions being obtained when both said cylinders are energized.

AXEL L. HIGHBERG.